[11] 3,625,590

[72] Inventor  Millard A. Habegger
              Poughkeepsie, N.Y.
[21] Appl. No. 874,171
[22] Filed     Nov. 5, 1969
[45] Patented  Dec. 7, 1971
[73] Assignee  International Business Machines
               Corporation
               Armonk, N.Y.

[54] OPTICAL CIRCULATOR AND ENERGY CONVERTER
     10 Claims, 5 Drawing Figs.

[52] U.S. Cl. .................................................. 350/150,
                              350/157, 350/160, 356/106 RL
[51] Int. Cl. .................................................. G02f 1/24
[50] Field of Search ....................................... 356/106
                    RL; 331/94.5; 350/147, 150, 152, 157, 160

[56] References Cited
UNITED STATES PATENTS
3,277,393  10/1966  Nicolai ........................ 331/94.5

Primary Examiner—John K. Corbin
Assistant Examiner—Paul R. Miller
Attorneys—Hanifin and Jancin and John F. Osterndorf ABSTRACT: Optical circulator or storage ring apparatus employing a nonreciprocal optical device and reflecting means to store optical energy. The device has the property that if a light beam is projected to it in one direction it is totally reflected and if projected to it in a second direction it is totally transmitted. By employing this device, optical energy may be coupled into and out of the circulator without optical loss. By exercising control over the polarization of the energy the circulator converts it so that it may be supplied in either continuous wave or pulse form. If a nonlinear crystal is located in the circulator in the path of the energy the apparatus acts to convert from a fundamental wavelength to a predetermined harmonic of that wavelength.

INVENTOR
MILLARD A. HABEGGER

BY *John F. Osterndorf*

ATTORNEY

3,625,590

OPTICAL CIRCULATOR AND ENERGY CONVERTER

BACKGROUND OF THE INVENTION

1. Field of the Invention

This invention relates to an optical circulator and energy converter apparatus and, more particularly, to a storage ring for optical energy which is operable to convert the form of the energy controllably supplied by it or to act as a harmonic generator. 2. Description of the Prior Art In the optics technology, many functions are capable of being performed within the cavity of laser device. For example Q switching is accomplished in a continuous wave type of laser to obtain a pulse output. The energy in each pulse may be high but the Q switch and therefor the laser is operable only on a low duty cycle basis.

Another example of a function performed in a laser cavity is the generation of a predetermined harmonic from a fundamental wavelength. Solid state lasers are known in the art that are capable of generating in continuous wave form watts of coherent light. However, the wavelength of the coherent light output is not suitable for use in many applications. By inserting a nonlinear crystal in the laser cavity the fundamental wavelength is converted to a predetermined harmonic. Such arrangements have the disadvantage of introducing some optical loses into the laser cavity. These losses reduce the power output from the laser by a substantial factor.

SUMMARY OF THE INVENTION

As contrasted with the prior art apparatus, the optical circulator of the invention employs a nonreciprocal optical device together with reflecting means to form a closed loop optical energy storage ring. Optical energy is coupled into and out of the ring through the device. It circulates in an equilibrium state until the polarization state of the energy is altered, causing it to be coupled out of the storage ring.

According to one aspect of the invention the optical energy coupled into the ring may be in pulse or continuous wave form. By suitably controlling polarization altering means, the pulse form of energy may be changed to continuous wave and the continuous wave form of energy to a pulse form.

According to another aspect of the invention a nonlinear crystal is inserted into the path of the circulating optical energy. The energy is converted to a predetermined harmonic of the fundamental of this energy. If one of the reflecting means is made transmissive to this harmonic the storage ring operates as a harmonic generator.

BRIEF DESCRIPTION OF THE DRAWING

Referring now to FIG. 1 an optical device 10 operates nonreciprocally in a unidirectional manner. This device is described and claimed more particularly in copending application Ser. No. 374,174 filed the same day as this application in the name of Millard A. Habegger and assigned to the same assignee as this invention.

Figure 1:
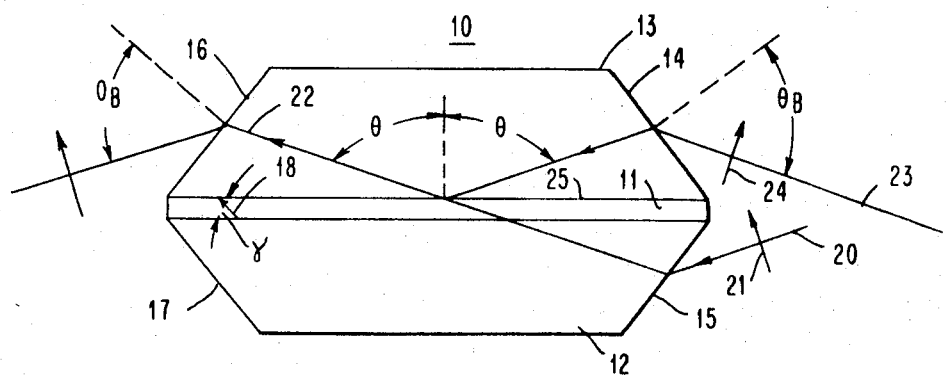
FIG. 1 is a schematic diagram of the nonreciprocal optical device employed in the apparatus of this invention.

In device 10 a birefringent plate 11 is formed with optical elements having windows, such as glass blocks 12, 13 in juxtaposed relationship with the incident faces of plate 11. Blocks 12, 13 are formed with Brewster angle windows 14, 15, 16, 17. The Brewster angle is indicated as $\theta_B$. Interposed between blocks 12, 13 and the respective faces of plate 11 is a film of oil having a refractive index equal to the higher index of refraction of plate 11. The glass blocks 12 and 13 also have an index of refraction corresponding to the higher index of refraction of plate 11. If the birefringent material of plate 11 is sodium nitrate, that is, a material exhibiting a negative birefringence, the index of refraction of the film of oil and the glass blocks would correspond with the ordinary index of refraction of the plate.

Plate 11 is characterized by having its optic axis 18 formed at an acute angle $\gamma$ with respect to the incident faces of plate 11. For sodium nitrate, this angle has been determined to be approximately 32°.

In operation, an input light beam 20 having a polarization direction 21 in the same plane as optic axis 18 is directed at window 15 of block 12. This beam is totally transmitted as beam 22 through plate 11 as it encounters a very small change in refractive index boundary between block 12 and plate 11. The polarization direction 21 of beam 20 is substantially perpendicular to optic axis 18. Beam 22 exits from the device through Brewster window 16.

When the light beam enters device 10 as beam 23 through window 14 and having a polarization direction 24, it is totally reflected at the face 25 of plate 11 into the path of beam 22. In this mode of operation beam 23 encounters a refractive index boundary at face 25 and therefore is totally reflected at this interface. Polarization direction 24 of beam 23 is substantially parallel to optic axis 18 of plate 11. The angle of incidence $\theta$ for beam 23 is substantially the same as the angle of refraction and for the material sodium nitrate it has been determined that this angle of incidence approximates 72°. The angle of incidence $\theta$ is greater than the critical angle as determined by the ratio of the lower index of refraction of plate 11 and the refractive index of the medium between plate 11 and block 13.

As is apparent, this nonreciprocal device differs from other types of optical devices such as conventional optical beam splitters. The nonreciprocal aspect of operation depends entirely on the direction of propagation of the incident beam of light and its polarization direction with respect to the optic axis of the device. The device is capable of totally reflecting substantially 100 percent of the incident energy when it is propagated as the beam 23 and of transmitting substantially 99 percent of the energy propagated in the reverse direction as the beam 20.

Figure 2:
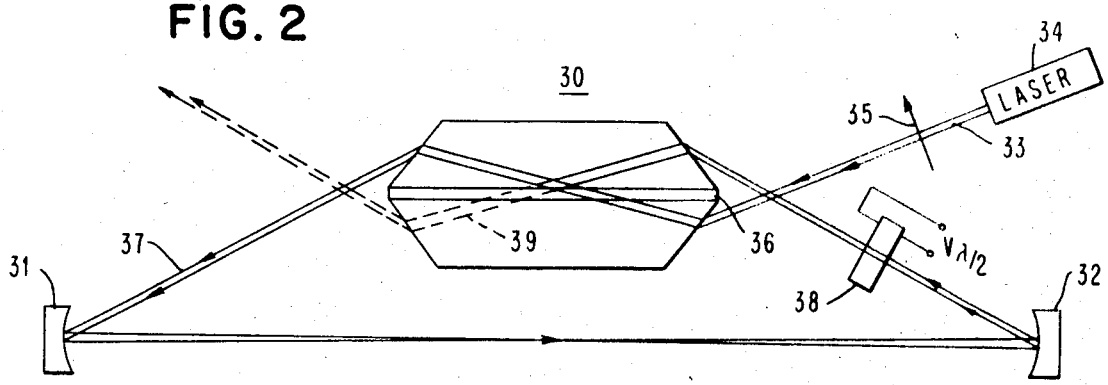
FIG. 2 is a schematic diagram of the optical circulator for storing optical energy.

In this invention, as shown in FIG. 2, the nonreciprocal optical device of FIG. 1, is employed at 30 in an optical circulator to form a storage ring or cavity. The ring is a closed loop formed of device 30 and fully reflecting mirrors 31 and 32 arranged such that a light beam follows a substantially triangular path.

A light beam 33 is coupled into the ring from a suitable source such as a laser 34. Beam 33 has a linear polarization direction 35. The beam enters the device through the window such as the Brewster window 15 of FIG. 1. It is totally transmitted through the birefringent plate 36 of device 30 and exits from the device through the Brewster window such as the window 16 of FIG. 1. The exited beam 37 follows the closed path determined by mirrors 31 and 32 reentering device 30 such as through the the Brewster window 14 as shown in FIG. 1. The beam is totally reflected at the incident face of plate 36 and again exits from device 30 through the window 16.

Employing the device 30 in a storage ring such as shown in FIG. 2 permits large amounts of power to be entered into the cavity of the ring with substantially 100 percent efficiency. The nonreciprocal optical device accepts the light so that there is virtually no loss on entry into this cavity. As a consequence, when laser 34 provides a power input of a few milliwatts, the level of the circulating power inside the cavity of the storage ring may reach an equilibrium level of 100 watts.

To obtain power from the cavity a light beam polarization control element such as an electro-optic switch 38, is inserted in the path of the light beam within the storage ring. As is well known in the art, such electro-optic switches may be formed of potassium dideuterium phosphate (KDP) crystals having transparent electrodes affixed to its faces. The particular KDP crystal utilized should have low light loss on transmission through it. When a voltage corresponding to the half wavelength voltage for the light beam is applied to the electrodes across the crystal, the polarization of a light beam incident on the crystal is rotated to a mutually orthogonal polarization state. When this is done to crystal 38 in the storage ring the polarization of the light reentering device 30 through window 14 is rotated such that it is now substantially perpendicular to the optic axis of plate 36. It is totally transmitted by plate 36 and follows the dotted line path 39 for coupling out of the circulator through the Brewster window corresponding to the window 17 of FIG. 1.

Figure 3:
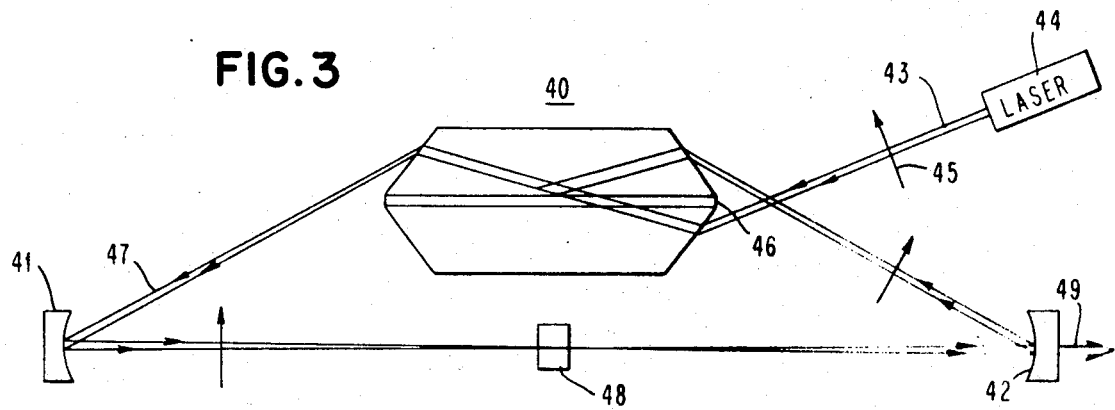
FIG. 3 is a harmonic generator utilizing the nonreciprocal optical device of FIG. 1.

This optical circulator enables many of the operations performed in a laser cavity to be performed in an easier and more efficient manner outside the cavity and within the circulator or storage ring. Referring now to FIG. 3, the optical circulator of FIG. 2 is modified slightly to function as a harmonic generator. The fundamental wavelength of the light beam supplied to the circulator is changed to provide an output from the circulator that is a predetermined harmonic wavelength of the fundamental.

The circulator is formed of the nonreciprocal optical device 40 and reflecting mirrors 41, 42. Mirror 41 is formed so as to be 100 percent reflecting for both the fundamental wavelength as well as the wavelength of the predetermined harmonic. Mirror 42 is formed to be 100 percent reflecting for the fundamental wavelength but 100 percent transmitting for the predetermined harmonic. The curvatures of the mirrors used in the circulator are formed to produce a small focused spot along the path between them. Positioned at this location is a nonlinear optical crystal 48. Crystal 48 may be disposed in an oven to maintain it at a predetermined crystal temperature. Antireflection coatings are deposited on the nonlinear crystal.

Light beam 43 is provided by laser 44 having a polarization direction 45. By way of illustration, the laser may be a Nd/YAG laser. This laser is a solid state continuous wave laser which produces an output having a wavelength of 1.06 microns.

Beam 43 is coupled into device 40 as described in conjunction with the circulator of FIG. 2. It follows the path through the circulator as beam 47, retaining the same polarization direction as indicated at 45. Virtually no optical loss occurs on the insertion of beam 43 into the circulator. The fundamental wave circulates around the ring with a loss of less than 1 percent during each revolution. The power level of the optical energy circulated around the ring in equilibrium may approximate several hundred watts.

The propagating fundamental wave 47 only propagates through crystal 48 in one direction. The conversion efficiency during each pass of the fundamental wave is inversely propagational to the fourth power of the diameter, of the focused spot inside nonlinear crystal 48. Therefore, this spot is made as small as possible. To assure that focusing occurs at this spot mirrors 41, 42 are separated a distance equal to one-half the sum of the radii of curvatures of the two mirrors. In the other two legs of the triangular loop fundamental wave 47 is propagated as a collimated beam.

The fundamental wave continuous to propagate through the circulator and an output which is a predetermined harmonic of the fundamental wave is provided at 49. Mirror 42 is formed so as to be transparent only at this predetermined harmonic wavelength. The particular nonlinear crystal determines the harmonic wavelength that is provided as output beam 49.

One such nonlinear crystal 48 which may be utilized to accomplish the generation of the second harmonic wavelength of the fundamental is a barium sodium niobate, $Ba_2NaNb_5O_{15}$, crystal. The wavelength of the second harmonic output beam 49 is 0.53 microns. This is a wavelength of green light previously obtainable only from gas lasers.

Figure 4:
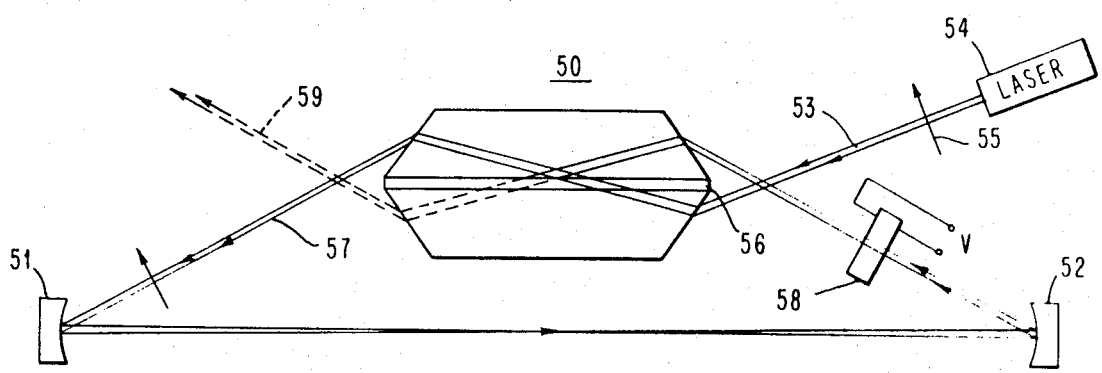
FIG. 4 is a schematic diagram of an energy converter utilizing the nonreciprocal optical device of FIG. 1.

Referring now to FIG. 4, the optical circulator of the invention is also utilized as an optical energy converter accepting laser output energy in the form of a very narrow pulse and converting it to a substantially continuous wave output or accepting a continuous wave laser output for conversion to a pulse form output.

In the energy converter, the nonreciprocal optical device is indicated at 50 as having a birefringent plate 56. The birefringent plate is of the type described for FIG. 1 and has an optic axis at a predetermined acute angle with respect to the incident faces of crystal 56. Device 50 is included in the circulator with mirrors 51, 52. Both of these mirrors are fully reflecting mirrors. Light beam 53 is provided by a suitable light source such as laser 54 with a polarization direction 55. As described in conjunction with the circulator of FIG. 2, beam 53 is coupled into the circulator through device 50. So long as the polarization direction of the light is the same as is indicated at 55, the beam is propagated through the circulator as beam 57.

If it is assumed that laser 54 is a continuous wave source of optical energy and it is desired to convert this continuous wave to the form of pulses, electrooptic switch 58 formed of a low loss KDP crystal is positioned in the path of circulating beam 57. When activated by applying the half wavelength voltage for that wavelength of light across switch 58 the polarization of circulating beam 57 is rotated to a mutually orthogonal direction. All the energy circulating as beam 57 is transmitted through plate 56 and is provided as beam 59 in a single pulse.

To provide a sequence of such pulses of energy the voltage is removed from switch 58 and the energy permitted to build up in the circulator again. The amount of energy obtained in each pulse is determined by the laser energy input rate and the pulse duty cycle.

Figure 5:
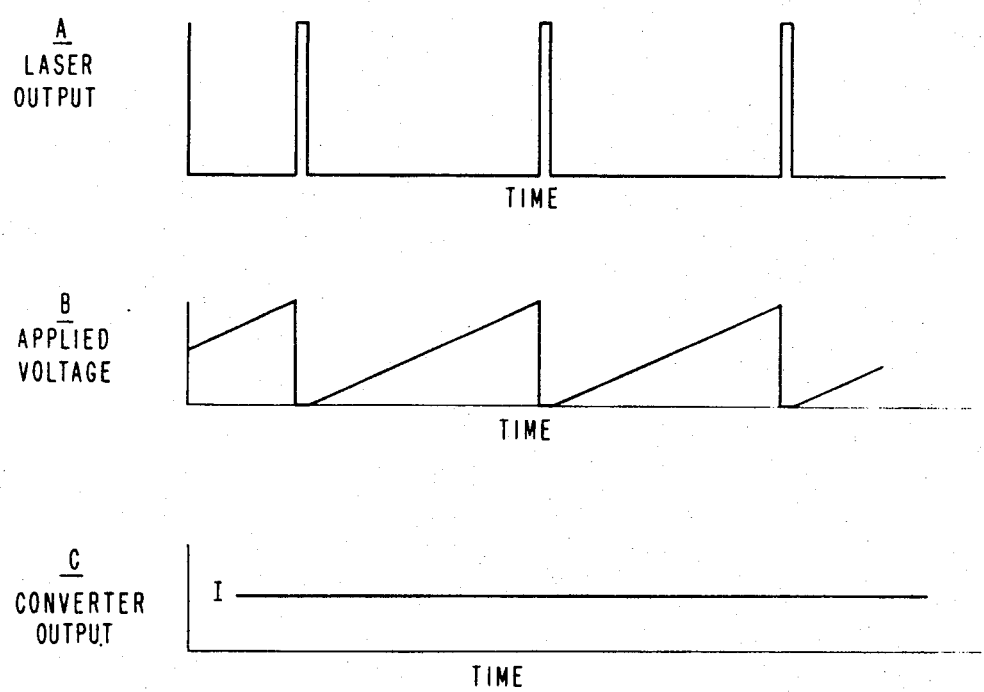
FIG. 5 is a timing diagram for illustrating one form of the operation of the converter of FIG. 4.

To obtain a continuous wave output from a pulse laser source the same circulator is employed. A light pulse is coupled into the circulator as beam 53 and propagates around the circulator as beam 57 at the speed of light. To obtain a quasi continuous wave output a small fraction of the circulating energy is leaked from the circulator at the end of each revolution. The rate of the leak is determined by the amount of voltage applied to electrooptic switch 58. To obtain a uniform output as beam 59 the voltage on switch 58 has to be increased slightly at the end of each revolution. Thus, as shown in FIG. 5A, light pulses from laser 54 are supplied as beam 53 to the circulator. A sawtooth voltage is applied in FIG. 5B to switch 58. In FIG. 5C the continuous wave converter output at 59 is substantially uniform.

The output approximates a totally continuous wave output. For a reasonable size circulator it requires a few nanoseconds for the light to make a complete revolution. If one of the known pulsed lasers which produces a pulse output every 50 nanoseconds is utilized as the laser 54, the tail of the light pulse input from the laser overlaps the leading edge of the light pulse in the circulator. As the laser pulse is made longer more overlap occurs in the circulator. The output 59 from the circulator is therefore not discrete pulses but a substantially constant level with some ripple on it as shown in FIG. 5C.

While the invention has been particularly shown and described with reference to the preferred embodiments thereof, it will be understood by those skilled in the art that the foregoing and other changes in form and details may be made therein without departing from the spirit and scope of the invention.

What is claimed is:
1. An optical energy circulator, comprising
   means including a nonreciprocal optical device for forming a closed path optical energy circulator,
   said device having means for coupling optical energy into the circulator and for causing said energy to follow continuously said path in said circulatory means, and
   means disposed in the path of the energy in the circulator for altering a predetermined parameter of said energy for causing at least a portion of it to be ejected from said circulator means.
2. The circulator of claim 1, wherein said energy coupled into said circulator means is at a fundamental wavelength and said last named means comprises a nonlinear optical device for acting on the wavelength parameter of said energy to generate a predetermined harmonic of said fundamental wavelength, whereby said circulator is a harmonic generator.

3. The circulator of claim 2, wherein said circulator means further includes first and second reflecting means, both said reflecting means being totally reflective to said fundamental wavelength and only said second reflecting means being totally transmissive to said predetermined harmonic, whereby said optical energy is ejected from said circulator means at the predetermined harmonic through said second reflecting means.

4. The circulator of claim 1, wherein said energy is coupled into said device to follow a predetermined path through said circulator means when the polarization of the optical energy is in a first linear polarization state,
said last named means being polarization altering means for selectively changing the polarization state of the optical energy to a second linear state causing said nonreciprocal optical device to eject said energy from said circulator means.

5. The circulator of claim 4, wherein said energy coupled into said circulator means is in continuous waveform and said polarization altering means is selectively activated at a predetermined duty cycle to change the polarization state to a mutually orthogonal polarization state, whereby pulses of optical energy are ejected from said circulator means.

6. The circulator of claim 4, wherein said energy is coupled into said circulator means as discrete pulses of energy and said polarization altering means is activated to provide an overlap between the energy revolving in the circular means and the energy entered into the circulating means, whereby a substantially continuous wave of energy is ejected by said device from said circulator.

7. A light storage cavity, comprising
a light storage ring including reflecting means and a nonreciprocal optical device having means for coupling a light beam into said ring—has been insert—arranged such that the light beam follows a closed loop path through the ring when the polarization of the light beam is in a first linear polarization state,
means for supplying a light beam linearly polarized in a first state to said device so that said beam follows the path through the ring, and
means in said storage ring in the path to alter the polarization state of said beam to a second state that is mutually orthogonal to said first state, so that said device causes said beam to follow a second path out of said storage ring.

8. An optical energy converter comprising
a light storage ring including reflecting means and a nonreciprocal optical device having means for coupling a light beam into and out of the ring, said reflecting means and device being arranged such that a light beam follows a closed loop path through the ring when the polarization of the light beam is in a first linear polarization state,
means for supplying a continuous wave light beam linearly polarized in a first state to said device so that said beam follows the path through the ring, and
means in said storage ring in the path to periodically alter the polarization state of said beam to a second state that is mutually orthogonal to the first state so that said device causes said beam to follow a second path out of said storage ring as pulses of light.

9. An optical energy converter, comprising a light storage ring including reflecting means and a nonreciprocal optical device having means for coupling a light beam into and out of the ring, said reflecting means and device being arranged such that a light beam follows a path through the ring when the polarization of the light beam is in a first linear polarization state,
means for supplying discrete pulses of light linearly polarized in a first state to said device so that said pulses follow the path through the ring, and
means in said storage ring in the path to alter the polarization state of said beam to a second state so that said discrete pulses entered into the ring overlap with the pulses following the path in the ring, whereby said device causes a substantially continuous wave beam to follow a second path out of said storage ring.

10. A harmonic generator, comprising
a light storage ring including first and second reflecting means and a nonreciprocal optical device having means for coupling a light beam into said ring, said reflecting means and said device being arranged such that a light beam follows a path through the ring, said second reflecting means only being fully transmissive at a desired wavelength,
means for supplying a light beam at a fundamental wavelength to said device so that said beam follows the path through the ring, and
nonlinear optical means in said storage ring in the path to convert the fundamental wavelength of said beam to a harmonic of the fundamental corresponding to the desired wavelength said beam at said harmonic is caused to follow a second path through said second reflecting means out of said storage ring.

* * * * *